J. C. CALDWELL.
POWER TRANSMITTING MECHANISM.
APPLICATION FILED FEB. 17, 1917.
1,261,693.
Patented Apr. 2, 1918.
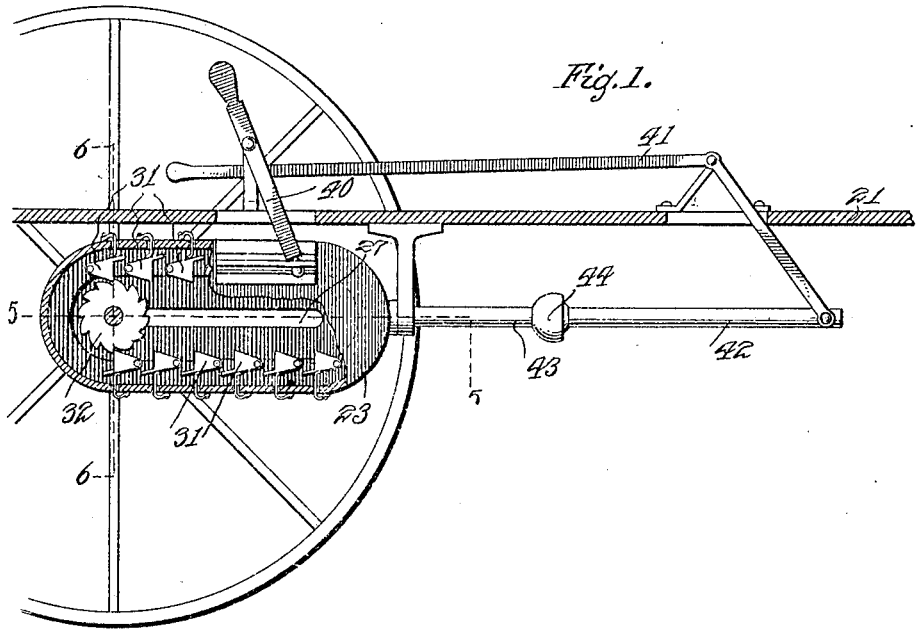
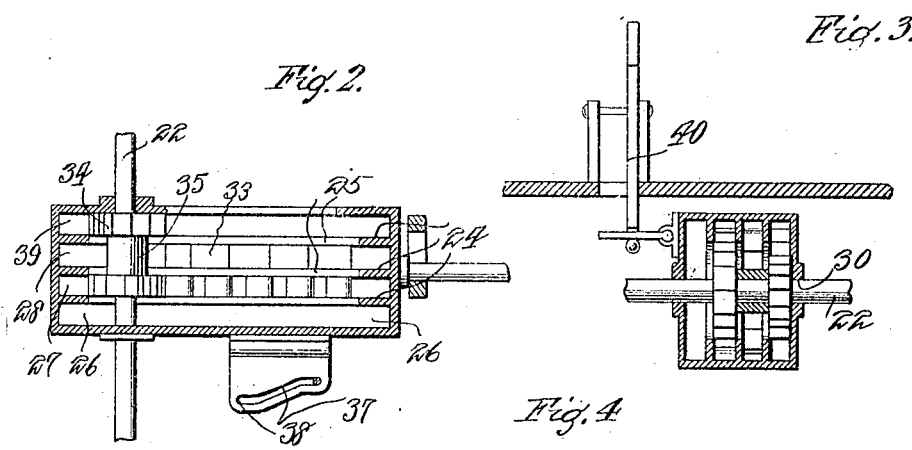
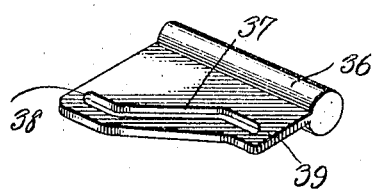
WITNESSES
INVENTOR
John C. Caldwell.
BY
ATTORNEY

UNITED STATES PATENT OFFICE.

JOHN C. CALDWELL, OF MIAMI, FLORIDA.

POWER-TRANSMITTING MECHANISM.

1,261,693.  Specification of Letters Patent.  Patented Apr. 2, 1918.

Application filed February 17, 1917. Serial No. 149,271.

*To all whom it may concern:*

Be it known that I, JOHN C. CALDWELL, a citizen of the United States, residing at Miami, in the county of Dade and State of Florida, have invented certain new and useful Improvements in Power-Transmitting Mechanism, of which the following is a specification.

This invention relates to a wave-motor and more particularly to a device for use in converting power from the undulations of the waves that especially occur in large bodies of water.

The primary object of the invention is to provide a mechanism mounted upon the side of a vessel and associated with a float buoyantly supported by the surface of the water whereby the mechanism may be made to rotate a power transmitting pulley by virtue of the operation of the mechanism incident to the rise and fall of the vessel and the float caused by the undulations or waves of the water.

A further object of the invention is the provision of a single power converting element in the form of a ratchet wheel associated with the operating mechanism in a manner that will convert the up and down motion into a rotary motion so that the power may be transmitted by a belt or other similar device.

The invention also aims to provide a power transmitting mechanism that will convert a reciprocatory motion into a rotary motion irrespective of whether the device is employed in connection with a buoyant float, a manually operated lever or a crank and connecting rod structure thereby permitting vehicles, machines and other mechanical devices to be actuated by the use of the device.

A further object of this invention is the provision of a wave-motor which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a longitudinal section of a fragmentary portion of a vehicle showing the device applied for the purpose of transmitting power to the vehicle.

Fig. 2 is a section on the line 5—5 of Fig. 1.

Fig. 3 is a section on the line 6—6 of Fig. 1.

Fig. 4 is a perspective view of one of the details of the invention.

Referring now to Figs. 1, 2, 3 and 4 it will be observed that I have illustrated the mechanism associated with a vehicle and also provided with means for reversing whereby the vehicle may be made to move in either direction. The platform 21 is supported in any suitable manner from the shaft 22 the latter being journaled in the wheels of the vehicle. Disposed beneath the platform is a reciprocatory casing 23. This casing is provided with a plurality of longitudinal partitions 24 which are provided with the large elongated openings 25 for establishing communication between the spaces or compartments 26, 27, 28 and 29 formed by the partitions. The opposite side walls of the casing are provided with the elongated slots 30 through which the shaft 22 is extended whereby the casing is slidably held upon the shaft. Mounted between the partitions embracing the compartments 27 in the upper portion thereof is a plurality of pawls 31 which are similar in construction to the pawls 17 of the above described form, and which will be normally held in engaged position. In the same compartment at the lower portion of the casing is another series of pawls 31 the engaging edges of which are disposed in the opposite direction to the pawls in the upper portion of the compartment. A ratchet wheel 32 is fixed to the shaft 22 and, as shown by Figs. 2 and 3 of the drawing, the pawls 31 are engaged with the ratchet 32 for imparting a reciprocatory motion to the ratchet whenever a reciprocatory motion is imparted to the casing. Mounted in the compartment 28, in the upper and lower portions thereof, are two more series of pawls 33 which are mounted to extend in the reverse direction to the pawls 31 in the adjacent compartment. Another ratchet wheel 34 is mounted upon the shaft 22 and is spaced from the ratchet wheel 32 by a spacing sleeve 35. This sleeve is long enough to cause the sprockets 32 and 34 to be held in spaced relation for a distance equal to the distance between three of the compartments in the casing so that when the sprocket 32 is in engagement with its corresponding series of pawls, the sprocket 34 will be disposed in the compartment 29 and, therefore, out of engagement with its corresponding series of pawls 33. In the reverse position, the sprocket or ratchet wheel 32 will be disposed in the compartment 26 while the ratchet wheel 34 engages its corresponding pawls 33.

This construction therefore, requires the casing to be moved into proper relative position for obtaining a forward and a reverse movement when operating the device. This is accomplished by a plate shown in detail in Fig. 4 which has a barrel 36 formed on one edge and its opposite edge has an offset for a distance equal to the distance between two of the compartments in the casing. A cam slot 37 is formed adjacent this edge of the plate and follows the lines of the edge so that the outmost terminal 38 of the slot is disposed outwardly beyond the opposite terminal 39 of the slot for a distance equal to the distance between two of the compartments. Pivotally mounted upon the platform 21 is a shifting lever 40 one end of which is extended through the slot 37. It is obvious, that when this lever 40 is swung on its pivot, its end will bear against the edge of the slot 37 and force the barrel over to one side for a distance equal to the transverse distance between the terminals of the said slot. The barrel 36 is fixed to the side of the casing so that the casing will be moved on the shaft 22 when the lever is operated. Therefore, the pawls will change their relative positions with respect to the ratchet wheels and the same may be engaged or disengaged according to the direction in which the vehicle is to travel.

For imparting the necessary reciprocatory motion to the casing I employ an operating lever 41 pivotally mounted upon the platform 21 and having its terminal connected to a connecting rod 42 which is joined to a shaft 43, carried by the casing, by a ball and socket joint 44. When the handle 41 is reciprocated, the necessary motion will be imparted to the casing thereby moving the same to transmit the power to the ratchet wheels to which the pawls are connected. The ratchet wheels, of course, being fixedly mounted to the shaft 22 will transmit the power to the wheels so that the vehicle may be moved in either direction by simply shifting the casing in the manner above described.

I claim:

1. A power transmitting mechanism comprising a casing mounted for reciprocatory movement, a shaft received in the casing, the said casing being longitudinally and laterally movable on the said shaft, a ratchet wheel carried by the shaft, the said casing being divided into compartments, a series of pawls arranged in one compartment and engageable with the ratchet wheel when the casing is in one position, a second series of pawls arranged in an adjacent compartment and engageable with the ratchet wheel when the said casing changes its relative position with respect to the ratchet wheel, a lever pivotally mounted and having one end disposed adjacent the side of the casing, and means fixed to the casing and associated with the lever for imparting the necessary lateral movement to the casing when the lever is actuated.

2. A power transmitting mechanism comprising a casing mounted for reciprocatory movement, a shaft received in the casing, the said casing being longitudinally and laterally movable on the said shaft, a ratchet wheel carried by the shaft, the said casing being divided into compartments, a series of pawls arranged in one compartment and engageable with the ratchet wheel when the casing is in one position, a second series of pawls arranged in an adjacent compartment and engageable with the ratchet wheel when the said casing changes its relative position with respect to the ratchet wheel, a lever pivotally mounted and having one end disposed adjacent the side of the casing, means fixed to the casing and associated with the lever for imparting the necessary lateral movement to the casing when the lever is actuated, the said means including a plate having an angular slot for the reception of the said lever.

3. A power transmitting mechanism comprising a casing mounted for reciprocatory movement, a shaft received in the casing, the said casing being longitudinally and laterally movable on the said shaft, a ratchet wheel carried by the shaft, the said casing being divided into compartments, a series of pawls arranged in one compartment and engageable with the ratchet wheel when the casing is in one position, a second series of pawls arranged in an adjacent compartment and engageable with the ratchet wheel when the said casing changes its relative position with respect to the ratchet wheel, a lever pivotally mounted and having one end disposed adjacent the side of the casing, a plate fixed to the casing and projecting laterally therefrom and provided with an angular slot having one end disposed outwardly in laterally spaced relation to its opposite end, and a lever pivotally mounted and received in the said slot whereby the casing will be laterally moved when the lever is mounted through the said slot.

4. A power transmitting mechanism comprising a casing mounted for reciprocatory movement, a shaft received in the casing, the said casing being longitudinally and laterally movable on the said shaft, a ratchet wheel carried by the shaft, the said casing being divided into compartments, a series of pawls arranged in one compartment and engageable with the ratchet wheel when the casing is in one position, a second series of pawls arranged in an adjacent compartment and engageable with the ratchet wheel when the said casing changes its relative position with respect to the ratchet wheel, a lever pivotally mounted and having one end disposed adjacent the side of the casing, a plate fixed to the casing and projecting laterally therefrom and provided with an angular slot having one end disposed outwardly in laterally spaced relation to its opposite end, a lever pivotally mounted and received in the said slot whereby the casing will be laterally moved when the lever is mounted through the said slot, and operating means connected to the casing and including a flexible joint whereby the said casing may be moved when the operating means is being actuated.

In testimony whereof I affix my signature in presence of two witnesses.

JOHN C. CALDWELL.

Witnesses:
W. A. KATSCH,
R. V. ATKISSON.